United States Patent
Kueblbeck et al.

(10) Patent No.: US 6,618,656 B2
(45) Date of Patent: Sep. 9, 2003

(54) METHOD FOR ROLLOVER DETECTION FOR AUTOMOTIVE VEHICLES WITH SAFETY-RELATED DEVICES

(75) Inventors: Hermann Kueblbeck, Schrobenhausen (DE); Ernst Rottenkolber, Petershausen (DE); Peter Steiner, Schrobenhausen (DE); Helmut Steurer, Gerolsbach-Junkenhofen (DE); Peter Weidel, Pfaffenhofen (DE)

(73) Assignee: Temic Telefunken microelectronic GmbH, Nuremberg (DE)

( * ) Notice: Subject to any disclaimer, the term of this patent is extended or adjusted under 35 U.S.C. 154(b) by 0 days.

(21) Appl. No.: 09/863,554

(22) Filed: May 22, 2001

(65) Prior Publication Data
US 2003/0023359 A1 Jan. 30, 2003

(30) Foreign Application Priority Data
May 22, 2000 (DE) .......................... 100 25 260

(51) Int. Cl.⁷ ................................ G06F 7/00
(52) U.S. Cl. ..................... 701/45; 701/46; 701/47; 180/271; 180/282; 340/440
(58) Field of Search ............... 701/45, 46, 47, 701/36; 280/728.1, 734, 735; 180/282, 271; 340/436, 438, 440

(56) References Cited

U.S. PATENT DOCUMENTS

| | | | |
|---|---|---|---|
| 5,557,520 A | 9/1996 | Suissa et al. | |
| 6,002,975 A | 12/1999 | Schiffmann et al. | |
| 6,038,495 A | 3/2000 | Schiffmann | |
| 6,055,472 A | 4/2000 | Breunig et al. | |
| 6,115,659 A | * 9/2000 | Buchheim et al. | ............ 701/45 |
| 6,141,604 A | 10/2000 | Mattes et al. | |
| 6,223,107 B1 | 4/2001 | Mergenthaler et al. | |
| 6,259,999 B1 | 7/2001 | Pantle | |
| 6,312,013 B1 | * 11/2001 | Baur et al. | ............ 280/735 |
| 2002/0013648 A1 | * 1/2002 | Feser et al. | ............ 701/45 |

FOREIGN PATENT DOCUMENTS

| | | |
|---|---|---|
| DE | 4325413 | 2/1995 |
| DE | 19609176 | 9/1997 |
| DE | 19609717 | 9/1997 |
| DE | 19732081 | 1/1999 |
| DE | 19748126 | 1/1999 |
| DE | 19744083 | 4/1999 |
| DE | 19744084 | 4/1999 |
| DE | 19814154 | 10/1999 |
| DE | 19828338 | 12/1999 |
| EP | 0430813 | 6/1991 |
| EP | 0965502 | 12/1999 |
| WO | WO 99/17963 | 4/1999 |
| WO | WO 99 50103 | 10/1999 |

* cited by examiner

Primary Examiner—Yonel Beaulieu
(74) Attorney, Agent, or Firm—W. F. Fasse; W. G. Fasse

(57) ABSTRACT

A method for rollover detection for automotive vehicles with safety-related devices, such as roll bars, (side) airbags and seat-belt tensioners involves the following steps and features. An angular rate of rotation ($\omega_x$) around the vehicle longitudinal axis is provided by the signal of a gyrosensor, and an initial position angle ($\alpha_0$) identifying the initial position of the vehicle transverse axis is determined from at least one sensor signal. An integral of the angular rate is added to the initial position angle. The absolute value of the resulting sum, which is proportional to the momentary inclination angle relative to the horizontal plane, is then compared to a trigger threshold that is a function of the angular rate and vehicle-specific parameters. A safety-related device is triggered if the absolute value of the resulting sum exceeds the trigger threshold.

12 Claims, 5 Drawing Sheets

METHOD FOR ROLLOVER DETECTION FOR AUTOMOTIVE VEHICLES WITH SAFETY-RELATED DEVICES

BACKGROUND OF THE INVENTION

1. Field of the Invention

The present invention relates to a method for rollover detection for automotive vehicles with safety-related devices, in which the angular velocity of rolling or rotary motions around the longitudinal axis (roll-axis) of the vehicle is measured by means of a gyrosensor.

2. Description of the Related Technology

A method for rollover detection is known from DE 196 09 717 A1, in which, in each case an angular rate sensor measures the angular velocity around the vertical axis (yaw axis), the longitudinal axis and the transverse axis (pitch axis) of the vehicle, and detects a rollover when at least one of the measured angular velocities exceeds a defined threshold value (limiting value) Furthermore, this publication proposes calculating the rotational energy of the vehicle from the angular velocities, and indicating an impending rollover when the rotational energy exceeds a defined threshold. However, the disadvantage of this method is that false decisions cannot be excluded, when for example the vehicle is traveling over steep terrain, is subject to slow rolling motions while traveling around curves or fast rolling motions, especially when entering steep curves.

In order to avoid such false decisions in the rollover detection, in DE 197 44 084 it is proposed to determine the initial position, that is the starting position of the vehicle, by measuring the accelerations of the vehicle in the directions of its vertical axis (yaw axis), longitudinal axis and transverse axis (pitch axis) in order to be able to calculate from them the initial position angle, that is the starting position angle. This initial position angle is used as an integration constant for integrating measured angular rates, for example around the longitudinal axis, to determine the current position angle of the vehicle. The implementation of this known method is expensive because it requires a large number of sensors—three acceleration sensors and at least one angular rate sensor. Apart from that, the reliability of this method needs improvement because the threshold value cannot be specified in such a manner that all the rollover scenarios which occur (that is fast and slow rollovers, driving through a steep curve or driving along a screw ramp with a subsequent rollover) are detected with certainty and reliability.

A method for detecting a rollover in which only one inclination sensor and one angular rate sensor are used is known from WO99/50103. In this known method, a safety-related device is triggered when both the signal from the angular rate sensor and the signal from the inclination sensor exceed their defined threshold values. Because only the angular velocity, taking into consideration the angular position of the vehicle, is used for detecting a rollover, only fast rollovers can be detected in good time with this arrangement, not however, slow, so-called quasi-static rollovers.

Finally, a safety system for automotive vehicles with an electronic arrangement for controlling at least one safety-related device in case of an automotive vehicle rollover is known from EP 0,430,813 B1. This safety system contains a gyrometer (angular rate sensor or gyrosensor) which measures the rotational velocity of the rolling motion, and accelerometers for measuring the acceleration values in the directions of the vertical, longitudinal and transverse axes in order to calculate from them a value proportional to the inclination angle in the transverse direction, etc. When a threshold value is exceeded by this last-mentioned value, the signals coming from the gyrometer and from the acceleration sensors are evaluated by the electronics arrangement which controls the triggering of the safety-related device by integrating the angular rate signal during a defined time window. This simply prevents the integration from overflowing.

The primary disadvantage of the triggering algorithm used in the above known safety system is that, as well as the signals of the angular rate sensor, other signals are required to prevent the integration from overflowing, namely signals from acceleration sensors which simply serve the purpose of enabling the angular rate sensor signals to be evaluated, but which result in high manufacturing costs for the overall system. A further known disadvantage is that the evaluation of the angular rate signal does not take into consideration the automotive vehicle position, that is the starting position angle in relation to the horizontal plane.

SUMMARY OF THE INVENTION

The object of the present invention is to provide a method for detecting rollovers in automotive vehicles which avoids the above-mentioned disadvantages, that is, it can be implemented economically, but is nevertheless highly reliable, both in respect of detecting a rollover in good time as well as in excluding false triggering.

According to the present invention, this object is achieved such that, starting from the position angle indicating the initial position of the vehicle, the integrated angular rate signal—as an angle of rotation—is added so that the amount of this value proportional to the momentary inclination angle (in relation to the horizontal plane) can be compared with a trigger threshold which is a function of the angular rate. If this trigger threshold is exceeded by the summation value, then a safety-related device is triggered, for example a roll bar, seat-belt tensioners and possibly a plurality of airbags.

In an advantageous embodiment of the method according to the invention, additional dynamic motion variables of the vehicle are recorded, these may preferably be accelerations in the directions of the vertical axis, the transverse axis and the inclination in relation to the horizontal position in the transverse direction, and their plausibility, that is their self-consistency, is evaluated. If these values are intrinsically self-consistent, from the acceleration values, the current inclination angle or, if the sensor generating the initial position signal is used as an inclination sensor, its value as a current inclination angle is used as the starting variable of the integration of the angular rate signal and the integral is reset to zero at the same time. However, if these values are not assessed as self-consistent, then the calculated inclination angle is reduced to an assessed value, and this assessed value is used as the starting variable of the integration of the angular rate signal, in which, here again, the integral is reset to zero before this assessed value is taken over.

With an integration of the angular rate performed over a longer period, errors and deviations from the actual angle of rotation are taken into account and avoided, so that the reliability of the method is further increased.

The value zero is preferably taken as the assessed value for the current inclination angle, or the value of the last inclination angle determined from the dynamic motion variables which was assessed as being self-consistent is used. In this regard, the calculated current inclination angle can be returned in stages to the assessed value in successive time segments, or this can take place continuously over a defined time segment.

This return eliminates several sources of error. So, on the one hand, the drift velocity (i.e. the stability of the quiescent value) of the gyrosensor is taken into account by selecting the time segments according to the magnitude of this drift velocity, preferably in the order of minutes, and, on the other hand, inertial forces resulting from dynamic processes may falsify the values of sensors which indicate the level of a fluid, and thus respond correspondingly slowly, or lead to a "spill over" in the case of short and sharp accelerations in their direction of sensitivity, or as acceleration sensors measured values generated under fast motions (for example in the Z- and Y-directions) do not permit a sufficiently exact calculation of an inclination because of the occurring inertial forces. Finally, when driven along a bumpy track, the minor inclination fluctuations which occur must be prevented from being integrated to form a critical value. The plausibility test only accepts a measured value as a value proportional to the inclination angle if all the sensors' measured values are in defined, self-consistent relations to one another.

Preferably, the vertical acceleration $a_z$ and, if applicable, the lateral acceleration $a_y$ can also be measured as additional dynamic motion variables—if the inclination is to be calculated from them—as well as the value for the inclination angle $\alpha$ supplied by the initial position sensor (more precisely: the value proportional to this). The $a_z$ and $a_y$ values supplied by the acceleration sensors and the $\alpha$ values generated by this inclination sensor, or the values calculated for the current inclination angle on the basis of the $a_z$ and $a_y$ values are tested for plausibility, i.e. for self-consistency. The advantage of these measures is that more accurate information about the current inclination angle can be generated, which then forms the integration constant for the angular rate signal which significantly increases the reliability.

BRIEF DESCRIPTION OF THE DRAWINGS

An embodiment according to the method of the invention is explained in detail in the following and illustrated by the figures.

They show.

DESCRIPTION OF THE PREFERRED EMBODIMENTS OF THE INVENTION

Figure 1:
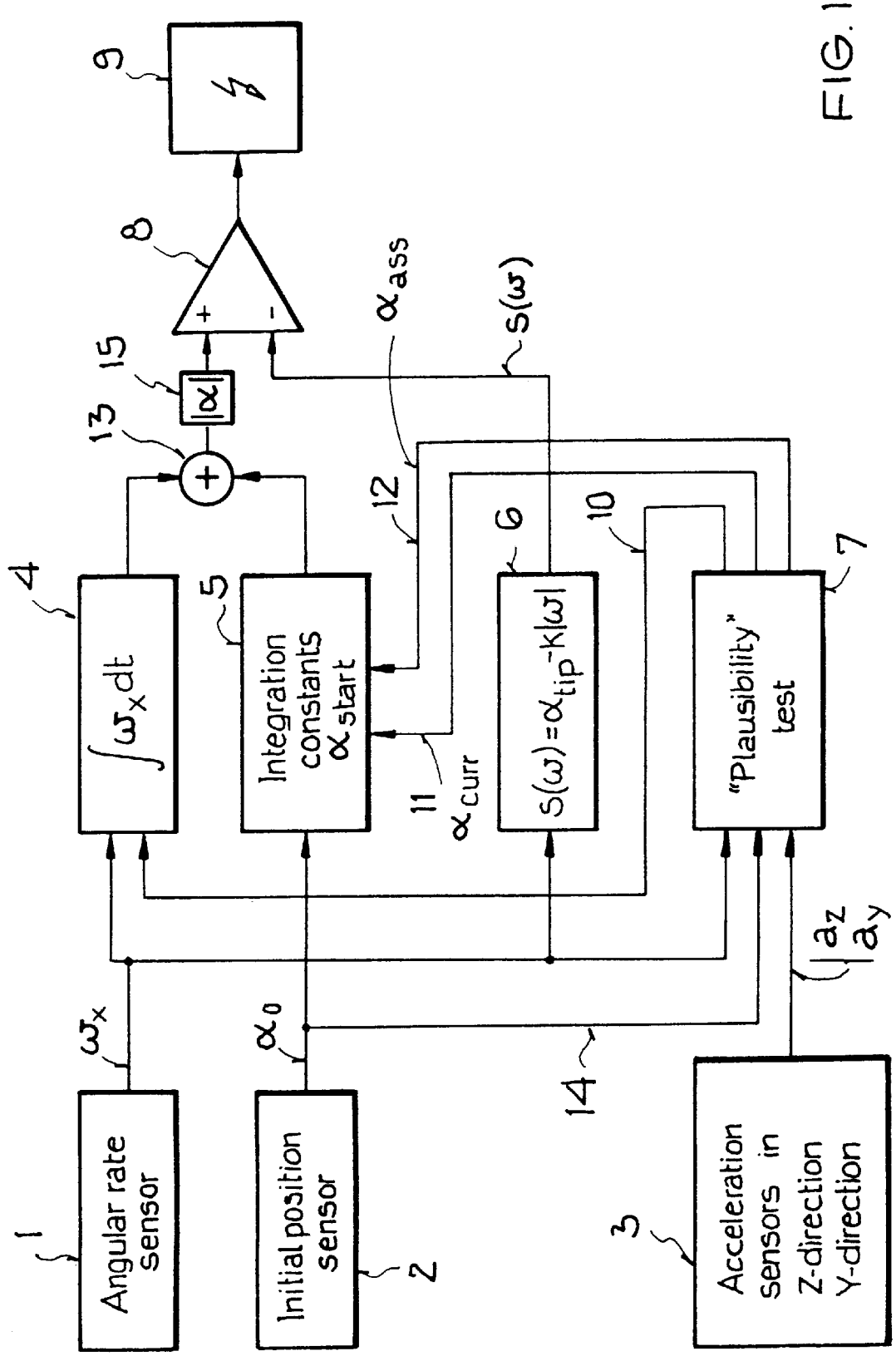
FIG. 1 a block diagram of a safety system for performing the method according to the invention with an angular rate sensor.

FIG. 1 shows, as an embodiment of the method according to the invention, a safety system for automotive vehicles with an ignition stage 9 for triggering a safety-related device, such as a roll bar, a seat-belt tensioner or (side) airbags. This safety system comprises an angular rate sensor or gyrosensor 1, which generates a signal proportional to the angular velocity $\omega_x$ (angular rate) around the longitudinal axis (X-axis) of the vehicle, which is fed to a function block 4 for calculating the angle of rotation integral $\int \omega_x dt$, a function block 6 for generating a trigger threshold value $S(\omega)$ according to the formula $\alpha_{tip}-k|\omega|$ and a function block 7 for the plausibility test. Thereby the vehicle-specific constant k is matched to the vehicle concerned, whereby this is determined, for example, from concrete crash signatures of a specific vehicle type and/or has been determined through experiments with this vehicle type. This constant k may also be variably set as a function of the vehicle state and/or from the crash sequence, that is as a function of the measured $\alpha$ and/or $\omega$ values. For example, k might be reduced if large $\alpha$ or $\omega$ values suddenly occur and the trigger threshold value $S(\omega)$ is thus lowered in order to ensure early triggering of the safety-related device if there is a fast rollover. Furthermore, prior $\alpha$ and/or $\omega$ values, that is the prior history of the vehicle state and/or a crash sequence, may be included. In this way, low $\alpha$ or $\omega$ values which have been present for a long time could lower the constant k with a consequent lowering of the trigger threshold value $S(\omega)$ in order to ensure reliable triggering even when the vehicle is turning over slowly. If the course of the prior $\omega$ values and/or signal components (for example, $a_z$ or $a_y$) of additional sensors enables a conclusion to be made about the wheels rebounding, this can be interpreted as the start of a rollover and lead to adaptation of the constant k, in that it is reduced.

Furthermore, an initial position sensor 2 is provided which generates a signal $\alpha_0$ proportional to the inclination of the transverse axis (Y-axis) of the vehicle in relation to the horizontal plane which is passed on to a function block 5 for generating an integration constant $\alpha_{start}$. Finally, additional sensors 3 are provided for detecting additional dynamic vehicle states, such as acceleration sensors in the direction of the vertical axis (Z-axis) and, if applicable, the transverse axis (Y-axis) whose measured values $a_z$ and $a_y$ and the signal $\alpha_0$ of the initial position sensor 2 are fed to the function block 7, whose function is described below.

The output signals of the function blocks 4 and 5 are added or summed to a value $\alpha_{curr,calc}$ proportional to the current inclination angle in the transverse direction of the vehicle with a summing element 13 according to the formula $$\int \omega_x dt + \alpha_{start}, \text{ with } \alpha_{start}=\alpha_0 \qquad (1)$$

and fed to the non-inverting input of a comparator 8 via an absolute value device 15. The trigger threshold value $S(\omega)$ generated by the function block 6 is present at the inverting input of the comparator 8.

As soon as the absolute value of the calculated value $\alpha_{curr,calc}$ at the comparator 8 exceeds the trigger threshold value $S(\omega)$, the H signal generated by the comparator 8 is fed to the ignition stage 9 to trigger a safety-related device which is not shown here.

Figure 2:
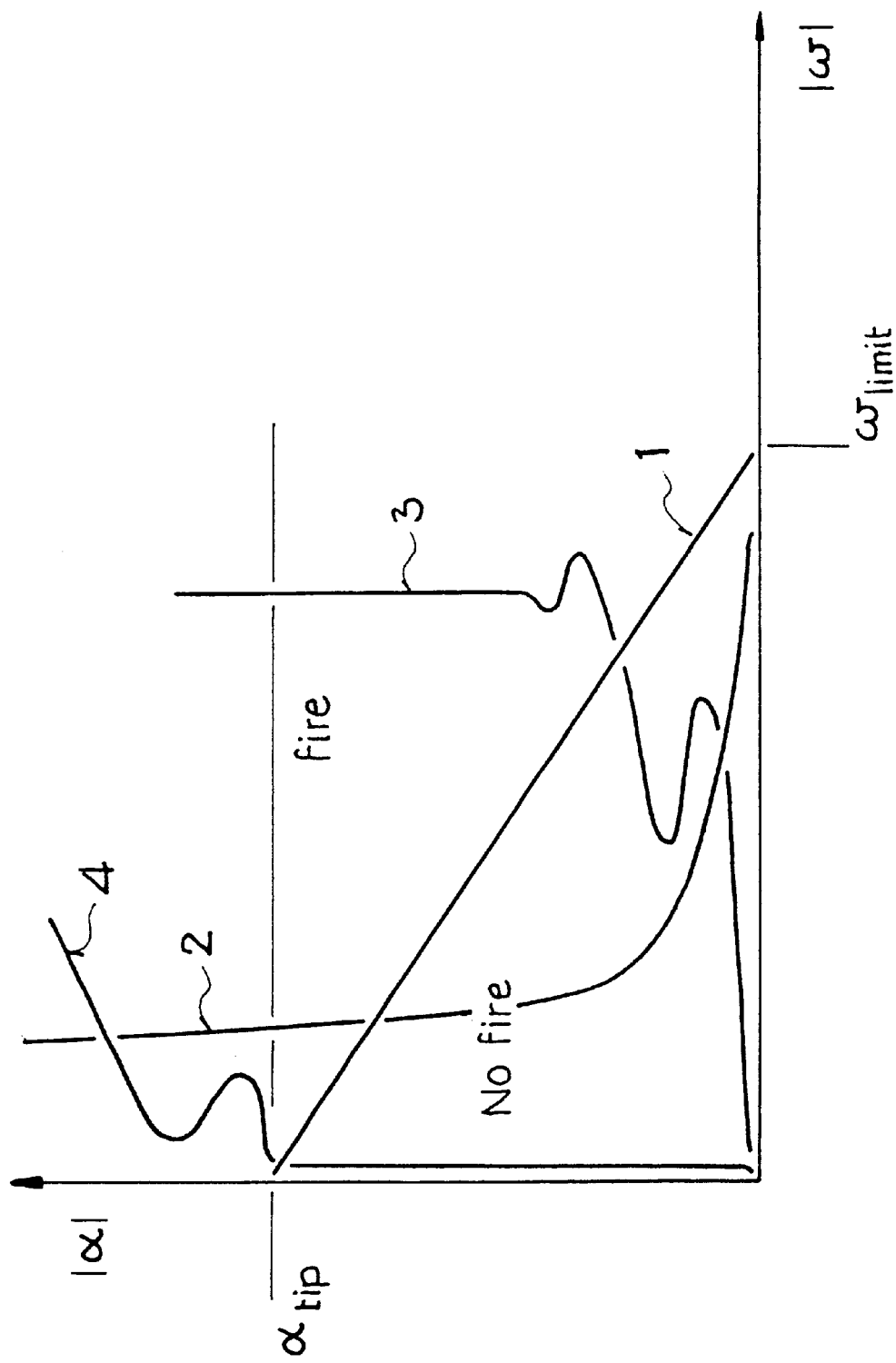
FIG. 2 an $\omega/\alpha$ graph of equation (2) as a theoretical rollover curve.

The formula for calculating the trigger threshold value, which has already been given above, $$S(\omega)=\alpha_{tip}-k|\omega|, \qquad (2)$$

with a vehicle-specific constant k represents a theoretical rollover curve of a vehicle whose $\omega/\alpha$ graph is shown in FIG. 2 with the reference number 1. Therein, $|\omega|$ represents the magnitude or value of the rotational velocity of the rolling motion which occurs in the case of an impending vehicle rollover in relation to its X-axis and $|\alpha|$ represents the magnitude or value of the inclination angle in the Y-direction of the vehicle. The $\omega/\alpha$ graph divides the first quadrant into two fields, which on the one hand concern vehicle states with $\omega/\alpha$ combinations which should lead to triggering of a safety-related device, that is fire scenarios, and on the other hand represent no-fire scenarios, whose $\omega/\alpha$ combinations should not lead to triggering of the safety-related device. The $\omega_{limit}$, 0 combination and 0, $\alpha_{tip}$ combination represent a boundary state of a vehicle with a rotational velocity $\omega_{limit}$ in relation to the X-axis and an inclination angle of 0° and/or with a rotational velocity 0 and an inclination angle (static tipping angle) $\alpha_{tip}$ which leads to a rollover. These parameters are vehicle-specific and therefore have to be determined for each vehicle type.

As well as the rollover curve. 1, FIG. 2 also shows three rollover scenarios with the curves 2, 3 and 4. Curve 2 shows the course of a rollover which starts with a high initial velocity, whereas in curve 3 the vehicle is driven onto a screw ramp and then rolls over. Curve 4 represents a quasi-static rollover in which the vehicle reaches the static tipping angle with an angular velocity of almost zero and then rolls over.

For the plausibility test, on the basis of the $\omega_x$ values provided by the angular rate sensor 1 and the $a_z$ and if applicable the $a_y$ values provided by the acceleration sensors 3, the above-mentioned function block 7 tests the plausibility, i.e. the self-consistency of either the measured values ($\alpha_0$) generated by the initial position sensor 2, which is used as an inclination sensor (and therefore is referred to as an inclination sensor in the following) or if applicable the angle calculated on the basis of the $a_z$ and $a_y$ values. The advantage of this measure is that more accurate information about the current inclination angle can be generated. That is, if a plausible, that is self-consistent value $\alpha_{curr}$ is present, then this value $\alpha_{curr}$ released via a line 11 connecting the function group 7 to the function group 5, and which at the same time resets the angle of rotation integral $\int \omega_x dt$ via a line 10 to function group 4 with the consequence that this value is set by the function group 5 as the starting angle $\alpha_{start}$ and thus serves as integration constant for the angle of rotation integral $\int \omega_x dt$ generated by the function group 4, and the most accurate value possible $\alpha_{curr,calc}$ can be calculated at the adder or summing element 13 in order to prevent triggering in no-fire scenarios with high reliability.

Figure 5:
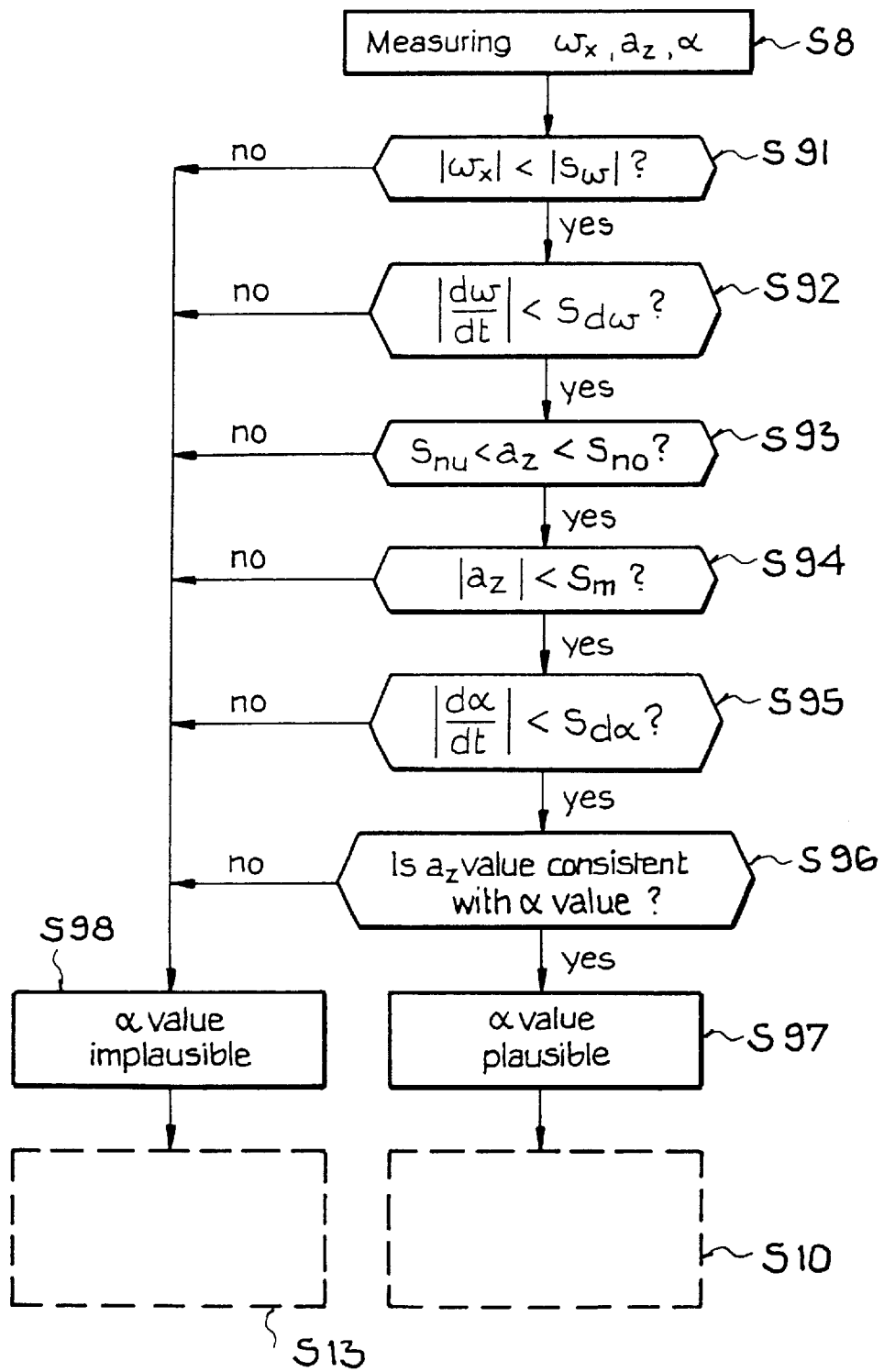
FIG. 5 a flow diagram for performing a plausibility test with the variables $\omega_x$, $a_z$ and $\alpha$.

The plausibility test therefore only accepts a measured value $\alpha_{curr}$ proportional to the current inclination angle of the vehicle generated by the inclination sensor 2 as such if all measured values of the other sensors involved are in defined self-consistent relations, and fulfill specific criteria, such as are shown below in connection with the explanation of FIG. 5.

The plausibility test can detect a "false" measured value of the inclination sensor, so that the starting angle $\alpha_{start}$ is reduced to an assessed value $\alpha_{ass}$. This assessed value $\alpha_{ass}$ is fed to the function group 5 via a line 12, while at the same time the angle of rotation integral $\int \omega_x dt$ is also reset via the already mentioned line 10. The value zero or the last value recognized as plausible can be used as the assessed value.

The risk of indicating a "false" value arises from, for example, the physical principle of conventional inclination sensors. Thus there are sensors which indicate the level of a fluid, and if there is a short, sharp acceleration in their direction of sensitivity this leads to an "overspill" and they may then indicate a value which is too high. Inertial forces acting on acceleration sensors can also lead to inexact measured values which make a plausibility test necessary.

Furthermore, the plausibility test should also correct fundamental errors occurring in the integration. Namely, on the one hand, the angle of rotation $\alpha_{curr}$ calculated by integration increasingly deviates from the actual angle of rotation with an increasing length of time as a result of error tolerances and, on the other hand, there is a risk when driving over uneven terrain, for example a bumpy track, that the low integration values ensuing therethrough are integrated with an increasing length of time and thus simulate an inclination.

Figure 3:
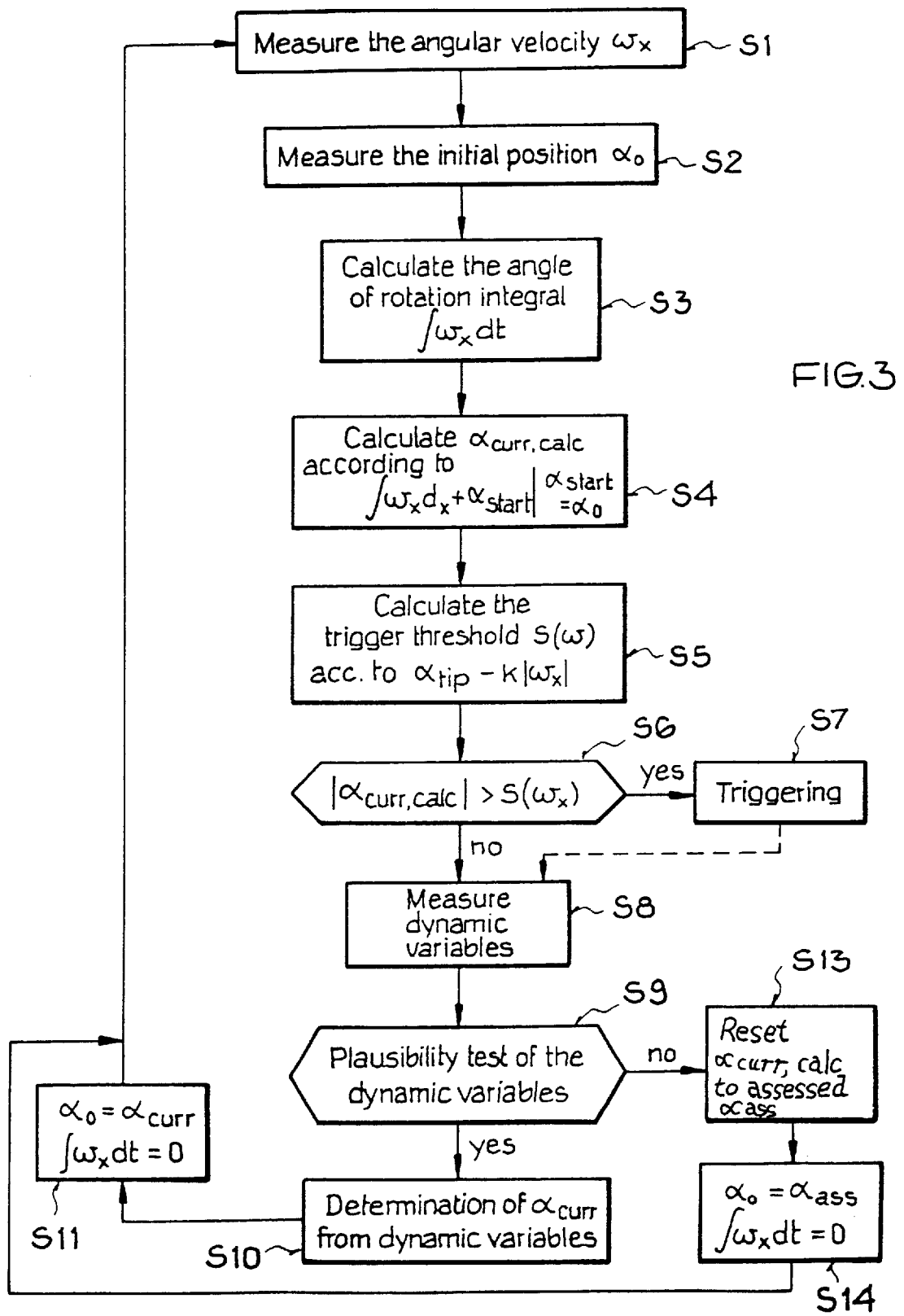
FIG. 3 a flow diagram for the software implementation of the safety system according to FIG. 1.

The processing steps to be taken by a microprocessor with a software implementation of the safety system according to FIG. 1 are shown in the flow diagram shown in FIG. 3. According to this, after the start (step S1), the signals of the angular rate sensor are first recorded as $\omega_x$ values and digitized. A similar process takes place in step S2 in respect of the initial position signal $\alpha_0$. The angle of rotation integral $\int \omega_x dt$ is then calculated in step S3, the summation for generating the value $\alpha_{curr,calc}$ by means of formula (1) and $\alpha_{start} = \alpha_0$ is carried out in step S4, and the trigger threshold value $S(\omega_x)$ is calculated by means of formula (2) in step S5, and subsequently the value $\alpha_{curr,calc}$ is compared with the trigger threshold value $S(\omega_x)$ (step S6).

If this trigger threshold value $S(\omega_x)$ is exceeded, then a safety-related device is triggered in step S7, for example a seat-belt tensioner, a side airbag or a roll bar. If the value $\alpha_{curr,calc}$ remains below this trigger threshold value $S(\omega_x)$, then the method continues with steps S8 and S9. These processing steps S8 and S9 can also follow the trigger step S7, for example to ensure that if another crash situation occurs, that is a so-called consequent crash, another safety-related device can be triggered.

The additional dynamic state variables of the vehicle measured in step S8 are subjected in step S9 to the plausibility test, which has already been described-above. If these variables can be assessed as intrinsically self-consistent, then the value for the current vehicle inclination angle $\alpha_{curr}$ can be determined from them in step S10 and this now serves as the initial value for the integration of the $\omega_x$ value in step S3, in which this integral was previously reset to the value zero and $\alpha_{curr}$ is defined as $\alpha_c$ (step S11). The method continues by measuring the $\omega_x$ value (step S1) and directly afterwards calculates the angle of rotation integral according to step S3, in which the measurement of the initial position (step S2) is naturally omitted.

If the result of the plausibility test according to step S9 is negative, then the calculated current value $\alpha_{curr,calc}$ is returned to an assessed value $\alpha_{ass}$ (step S13). This assessed value $\alpha_{ass}$ then defines the value $\alpha_0$, so that the method is continued with step S14 together with resetting the angle of rotation integral $\int \omega_x dt$ to the value zero.

Figure 4:
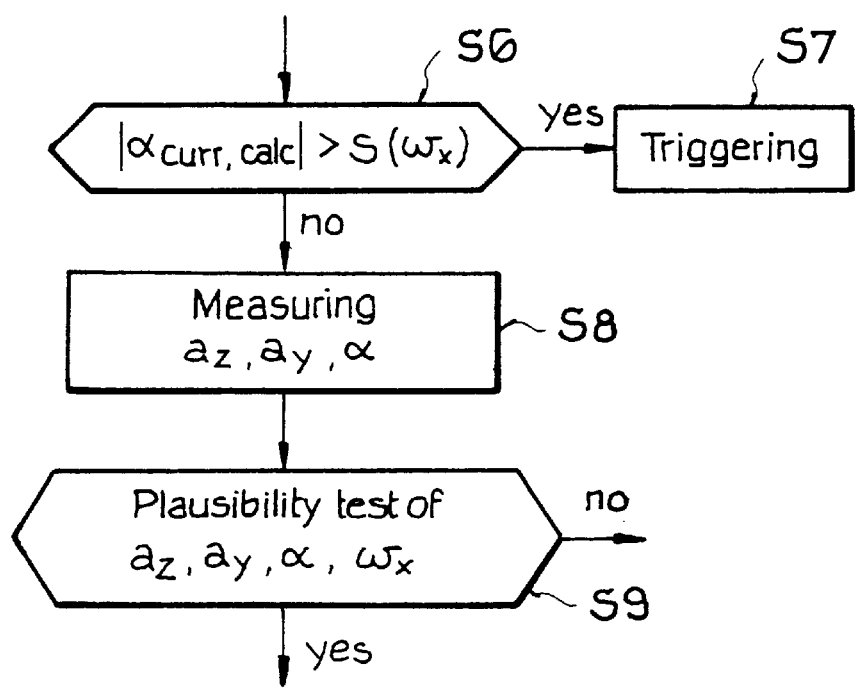
FIG. 4 a section of the flow diagram according to FIG. 3 which states concrete dynamic variables for performing a plausibility test.

According to FIG. 4, the acceleration in the direction of the vertical axis (Z-axis) of the vehicle and the value $\alpha$ of the inclination sensor 2 (step S8) are used as additional dynamic state variables. These variables, together with the value $\omega_x$ measured by the gyrosensor 1, are tested for self-consistency in the manner shown in FIG. 5, that is whether the value $\alpha$ measured by the inclination sensor can be taken as plausible.

According to this flow diagram, the $\omega_x$ value is first checked to see whether it remains below a defined threshold $S_\omega$ in order to exclude, for example, "false" values resulting from the inertia of the fluid in an inclination sensor (step S91).

According to step S92, the rate of change of velocity of the $\omega_x$ value may also not exceed a defined threshold $S_{d\omega}$. If this threshold is exceeded, this means that the effect of inertial forces may lead to a "false" measured value.

According to step S93, $a_z$ values, must not be inconsistent with the conditions of a stable and normal vehicle state, therefore the $a_z$ value may neither be too small—because otherwise ground undulations are recorded or there is a large inclination angle—nor too large, because then potholes will be recorded or a steep turn is being driven through. The thresholds $S_{no}$ and $S_{nu}$ are therefore defined on the basis of vehicle data and experiments, taking the measurement tolerances of the $a_z$ sensor into consideration.

The condition according to step S94 is used to test whether the vehicle is being driven over a bumpy surface. To do this, the $a_z$ values are filtered with a high-pass or band-pass filter (in the kHz range) and the result of these filtered values is compared with a threshold $S_m$. If this threshold is exceeded, there is a bumpy surface, in which case the inclination sensor could supply "false" values.

Step S95 also tests whether the rate of change of velocity of the value α supplied by the inclination sensor, which is measured at a threshold $S_{dα}$, is too high because then forces act on the vehicle which cause the fluid in the inclination sensor to wobble, which results in the generation of "false" values.

Finally, a check is made to see whether the value α is consistent with the $a_z$ value measured by the acceleration sensor in the Z-direction (step S96), because the last named value must approximately correspond to cos α.

If all the conditions in steps S91 to S96 are present, then the value α supplied by the inclination sensor is assessed as plausible (step S97). If, on the contrary, one of these conditions is not fulfilled then this value is assessed as implausible (step S98). It should be clearly understood, in the context of the plausibility test, that all the tests listed in FIG. 5 do not need to be performed, and also that still further test conditions can be made.

In the case of a plausibility test producing a negative result, returning to an assessed value $α_{ass}$ can be done in various ways. Firstly, the value zero can be used as the assessed value $α_{ass}$, above all if a very long time has elapsed since the last value α was assessed as plausible. Alternatively, the last value α assessed as being plausible can be used as the assessed value $α_{ass}$.

The current calculated value $α_{curr,calc}$ may also be returned to the assessed value $α_{ass}$ in various ways. For example, the return may take place immediately or after a delay, in one step or in stages at successive time intervals, that is both the starting angle $α_{start}$ in the direction of the assessed value as well as the angle of rotation integral $\int ω_x dt$ in the direction of the value zero, as well as continuously over a defined period of time. The time intervals thereby selected are determined according to the drift velocity of the gyrosensor being used (which corresponds to the stability of the quiescent value) and ranges in the order of minutes and/or according to the value of the resolution of the measurement.

What is claimed is:

1. Process for rollover detection for automotive vehicles with safety-related devices wherein, by means of an angular rate signal ($ω_x$) generated by a gyrosensor (1) in respect of a rotation around the longitudinal axis (X-axis) of the vehicle and by means of an initial position signal ($α_0$) generated by a sensor (2) stating the initial position of the transverse axis of the vehicle, the following process steps are performed:

a) calculation of the current inclination angle ($α_{curr,calc}$) according to $$\int ωdt + α_{start} = α_{curr,calc}, \text{ with } α_{start} = α_0 \quad (1)$$

b) generating a trigger threshold ($S(ω)$) according to $$S(ω) = α_{tip} - k|ω|, \quad (2)$$

in which $α_{tip}$ corresponds to the static tipping angle of the vehicle and k is a settable vehicle-specific constant which is also a function of the vehicle condition and/or the crash sequence, c) comparison of the value of the absolute amount of the calculated angle of inclination ($α_{curr,calc}$) with the value of the trigger threshold ($S(ω)$), and d) generation of a trigger signal for at least one safety-related device when the trigger threshold ($S(ω)$) is exceeded according to $$|α_{curr,calc}| > S(ω).$$

2. Process according to claim 1 wherein, as well as the detection of the angle of rotation ($ω_x$) and the initial position ($α_0$) of the vehicle, additional dynamic motion variables ($a_y$, $a_z$, $α_{incl}$) of the vehicle are detected and the following additional process steps are performed:

e) evaluation of the values of the additional dynamic motion variables ($a_y$, $a_z$, $α_{incl}$) for self-consistency, f) determination of the current inclination angle ($α_{curr}$) from the dynamic motion variables ($a_y$, $a_z$, $α_{incl}$) if the dynamic motion variables ($a_y$, $a_z$, $α_{incl}$) are evaluated as self-consistent, f1) resetting the calculated current inclination angle ($α_{curr,calc}$) to the value of this current inclination angle ($α_{curr}$), f2) resetting the integral $\int ω_x dt$ to the value zero, and f3) then calculating the current inclination angle ($α_{curr,calc}$) according to:

$$\int ωdt + α_{start} = α_{curr,calc}, \text{ with } α_{start} = α_{curr} \quad (1')$$

g) returning the calculated current inclination angle ($α_{curr,calc}$) to an assessed value ($α_{ass}$) of the current inclination angle ($α_{curr}$), when the values of the dynamic motion variables ($a_y$, $a_z$, $α_{incl}$) are evaluated as not being self-consistent and then calculating the current inclination angle ($α_{curr,calc}$) according to:

$$\int ωdt + α_{start} = α_{curr,calc} \text{ with } α_{start} = α_{ass}. \quad (1'')$$

3. Process according to claim 2 wherein the value zero or the value of the last of the inclination angles determined from the dynamic motion variables ($a_y$, $a_z$, $α_{incl}$) which was evaluated as self-consistent is used as the assessed value ($α_{ass}$).

4. Process according to claim 3 wherein the calculated current inclination angle ($α_{curr,calc}$) is returned in stages to the assessed value ($α_{ass}$) in successive time segments.

5. Process according to claim 4 wherein at least the vertical acceleration ($a_z$) and lateral acceleration ($a_y$) detected by acceleration sensors (3) and the inclination angle of the vehicle detected by an inclination sensor (2) are used as dynamic motion variables ($a_y$, $a_z$, $α_{incl}$).

6. Process according to claim 5 wherein the signal of the inclination sensor (2) is defined as the value of the current inclination angle ($α_{curr}$) in accordance with process step f).

7. Process according to claim 3 wherein the calculated current inclination angle, ($α_{curr,calc}$) is continuously returned to the assessed value ($α_{ass}$) during a defined time segment.

8. Process according to claim 7 wherein at least the vertical acceleration ($a_z$) and lateral acceleration ($a_y$) detected by acceleration sensors (3) and the inclination angle of the vehicle detected by an inclination sensor (2) are used as dynamic motion variables ($a_y$, $a_z$, $α_{incl}$).

9. Process according to claim 8 wherein the signal of the inclination sensor (2) is defined as the value of the current inclination angle ($α_{curr}$) in accordance with process step f).

10. Process according to claim 2 wherein at least the vertical acceleration ($a_z$) and lateral acceleration ($a_y$) detected by acceleration sensors (3) and the inclination angle of the vehicle detected by an inclination sensor (2) are used as dynamic motion variables ($a_y$, $a_z$, $α_{incl}$).

11. Process according to claim 10 wherein the signal of the inclination sensor (2) is defined as the value of the current inclination angle ($\alpha_{curr}$) in accordance with process step f).

12. A process for rollover detection in a motor vehicle equipped with a safety-related device, comprising the steps:
   a) providing an angular rate of rotation of the vehicle about a longitudinal axis of the vehicle, from a signal generated by a first gyrosensor;
   b) providing an initial position angle defining an initial angular position of a transverse axis of the vehicle, from at least one signal generated by at least one second sensor;
   c) calculating a current inclination angle as a sum of the initial position angle and a time integral of the angular rate;
   d) providing a trigger threshold as a predetermined static tipping angle of the vehicle minus a product of a constant and the absolute value of the angular rate, wherein the constant is a settable vehicle-specific constant that is also a function of at least one of a vehicle condition of the vehicle and a crash sequence which the vehicle is undergoing;
   e) comparing the absolute value of the current inclination angle with the trigger threshold; and
   f) if the absolute value of the current inclination angle exceeds the trigger threshold, then generating a trigger signal that is indicative of the detection of a rollover condition of the vehicle and that is adapted to trigger the safety-related device.

* * * * *

UNITED STATES PATENT AND TRADEMARK OFFICE
CERTIFICATE OF CORRECTION

PATENT NO. : 6,618,656 B2
DATED : September 9, 2003
INVENTOR(S) : Kueblbeck et al.

It is certified that error appears in the above-identified patent and that said Letters Patent is hereby corrected as shown below:

<u>Title page,</u>
Item [*] Notice, should read: -- Subject to any disclaimer, the term of this patent is extended or adjusted under 35 U.S.C. 154(b) by 196 days --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,618,656 B2
DATED : September 9, 2003
INVENTOR(S) : Kueblbeck et al.

It is certified that error appears in the above-identified patent and that said Letters Patent is hereby corrected as shown below:

Title page,
Item [*] Notice, after "by", replace "0 days" by -- 196 days --.

Column 5,
Line 27, before "released", insert -- is --.

Column 6,
Line 57, after "values", delete ",".

Signed and Sealed this

Seventh Day of June, 2005

JON W. DUDAS
*Director of the United States Patent and Trademark Office*